United States Patent [19]

Williston et al.

[11] Patent Number: 5,018,042

[45] Date of Patent: May 21, 1991

[54] TINGLE VOLTAGE FILTER

[76] Inventors: Dale B. Williston; David R. McGinn, both of Ontario Hydro, 700 University Ave., Toronto, Ontario, Canada, M5G 1X6

[21] Appl. No.: 450,245

[22] Filed: Dec. 13, 1989

[51] Int. Cl.$^5$ .............................. H02H 3/00
[52] U.S. Cl. ................................... 361/42; 324/509
[58] Field of Search ................ 361/42, 44, 45, 54, 361/56, 86; 324/509

[56] References Cited

U.S. PATENT DOCUMENTS

| | | | |
|---|---|---|---|
| 3,569,826 | 3/1971 | Burnett | 324/51 |
| 3,757,169 | 9/1973 | Beresnikow | 317/18 |
| 3,760,298 | 9/1973 | Pell | 361/42 X |
| 3,947,759 | 3/1976 | Briggs | 324/51 |
| 3,963,981 | 6/1976 | Vis | 324/51 |
| 4,188,574 | 2/1980 | Allington | 324/51 |
| 4,573,098 | 2/1986 | Williston | 361/42 |
| 4,591,941 | 5/1986 | Gruchalla et al. | 361/42 X |

Primary Examiner—Derek S. Jennings
Attorney, Agent, or Firm—Ridout & Maybee

[57] ABSTRACT

A tingle voltage filter, comprising a saturating reactor connected between the neutral and the local bonding to ground of an electrical service so as to reduce ground currents, is associated with a device to determine whether the potential, referred to a remote ground, at the bonding significantly exceeds that at the neutral, also referred to a remote ground, thus indicating a wiring fault which may make desirable removal of the impedance of the filter from the local connection between the neutral and the bonding. Upon detecting such a condition, the device closes a switch to bypass the filter. The device also contains indicators of elevated potential of the local ground bonding relative to the remote ground, and elevated potential of the neutral relative to the remote ground, to provide further indications of abnormal conditions and of proper operation of the filter.

8 Claims, 3 Drawing Sheets

TINGLE VOLTAGE FILTER

BACKGROUND OF THE INVENTION

1. Field of the Invention

This invention relates to apparatus for overcoming the problem known as "tingle voltage", in which differential potentials occurring due to ground current flows in the vicinity of a structure having an electrical supply system result in low level electric shocks to persons or livestock exposed to those differential potentials.

2. Review of the Art

The problems associated with tingle voltage phenomena are discussed in U.S. Pat. No. 4,573,098 (Williston). This patent proposes a solution to those problems, which involves the insertion of a device known as a tingle voltage filter, consisting primarily of a saturating inductor, normally having high alternating current impedance but having a low impedance under fault conditions, into the neutral to ground connection of an installation to be protected. The purpose of the filter is to ensure that under normal conditions, its impedance will be high compared with that of the ground current flow paths across which tingle voltage may be developed, so that potential differences are developed mainly across the filter rather than across the ground flow paths. Under fault conditions in which a large potential is applied to the filter, the inductor will saturate, reducing its impedance so that a large current flows and normal circuit protection devices can operate. This filter has proved successful in practice in overcoming tingle voltage problems. There are however certain fault conditions which could theoretically result in substantial and sustained tingle voltages occurring in the presence of the tingle voltage filter. These conditions are in general associated with wiring errors which should not but nevertheless could occur. There is also a slight possibility of certain low level i.e. high impedance, faults occurring which might also tend to result in higher tingle voltages with a tingle voltage filter present than would occur otherwise.

In all of these fault conditions, the problem derives from a sustained current which flows into the bonding ground of the protected structure. The current is limited to a low enough value that the normal circuit protective devices do not operate, usually by the impedance of an electrical appliance. In an installation not containing a tingle voltage filter, this current would be able to return to the power system neutral directly through the neutral to ground connection in the distribution panel. With a filter however, the impedance of the filter causes a bonding ground potential rise and tingle voltages, greater than would otherwise occur. The inductor in the filter can be constructed such that when it is saturated, the impedance of the filter is low enough that the tingle voltage increase is acceptably small. However, at the times during which this current is changing directions, the inductor becomes unsaturated for a brief interval, which is small in comparison to the period of the power supply. During this interval, the inductor's impedance is high, and so most of the power supply voltage at that time will appear across the filter. Where this current is highly reactive or highly capacitive, the power supply voltage will be near its peak of 170 volts at these times and therefore the tingle voltages may contain peaks approaching this value. In spite of this high peak magnitude, due to the short duration of the peaks, a root-mean-square voltage measurement of the tingle voltage under these conditions would yield an acceptably small value. Although the root-mean-square measurement technique is commonly used for measurement of non-sinusoidal waveforms, there exists no experimental evidence to justify the assumption that humans or livestock are responsive to root-mean-square voltage, and the significance of peak voltage is undetermined.

A further problem which has hampered acceptance of the tingle voltage filter of the Williston patent is its very unobtrusiveness during normal operation, since it has no means of providing assurance to a user that it is indeed operative.

SUMMARY OF THE INVENTION

The present invention seeks to provide an improved tingle voltage filter in which conditions relevant to proper operation of the filter are monitored, and in which the filter is automatically bypassed should a circumstance arise in which its presence might provide an increased exposure of persons or livestock to tingle voltages. The occurrence of such a circumstance is detected through monitoring the potential of the bonding ground of the protected structure (also known as the service ground) with respect to a remote ground which is taken to be "true" ground. An excessive value of this potential which may either be a value above a certain threshold, or a value larger than the value of the potential of the neutral conductor with respect to the remote ground, triggers the automatic bypass. Preferably a peak-detecting means is used in monitoring the potentials, so as to increase the sensitivity of the device to faults involving current flow through the tingle voltage filter's inductor. Preferably the status of the filter is signalled to provide an indication of the existence of potentially hazardous conditions.

Accordingly the invention provides, in apparatus for reducing differential potentials between different portions of a grounded structure due to current flow through ground paths in that structure, said apparatus comprising a saturating inductor in a connection between a bonding ground to the structure and a neutral conductor of an electrical supply utilized in association with the structure, the improvement wherein;

the apparatus further includes means to establish a circuit bypassing said saturating inductor;

means to establish a reference ground remote from the bonding ground;

monitoring means responsive to conditions under which the retention of said saturating conductor in said connection would be potentially hazardous, including means to sense the potential difference between the bonding round to which the inductor is connected and the remote reference ground; and means, responsive to the sustained presence of an excessive potential difference between the bonding ground and the remote ground to actuate said bypass circuit establishing means.

SHORT DESCRIPTION OF THE DRAWINGS

FIG. 1 is a diagrammatic illustration of a typical installation of apparatus according to the invention; and FIGS. 2A and 2B together form a schematic circuit diagram of the sensor unit shown in FIG. 1.

DESCRIPTION OF THE PREFERRED EMBODIMENT

Figure 1:
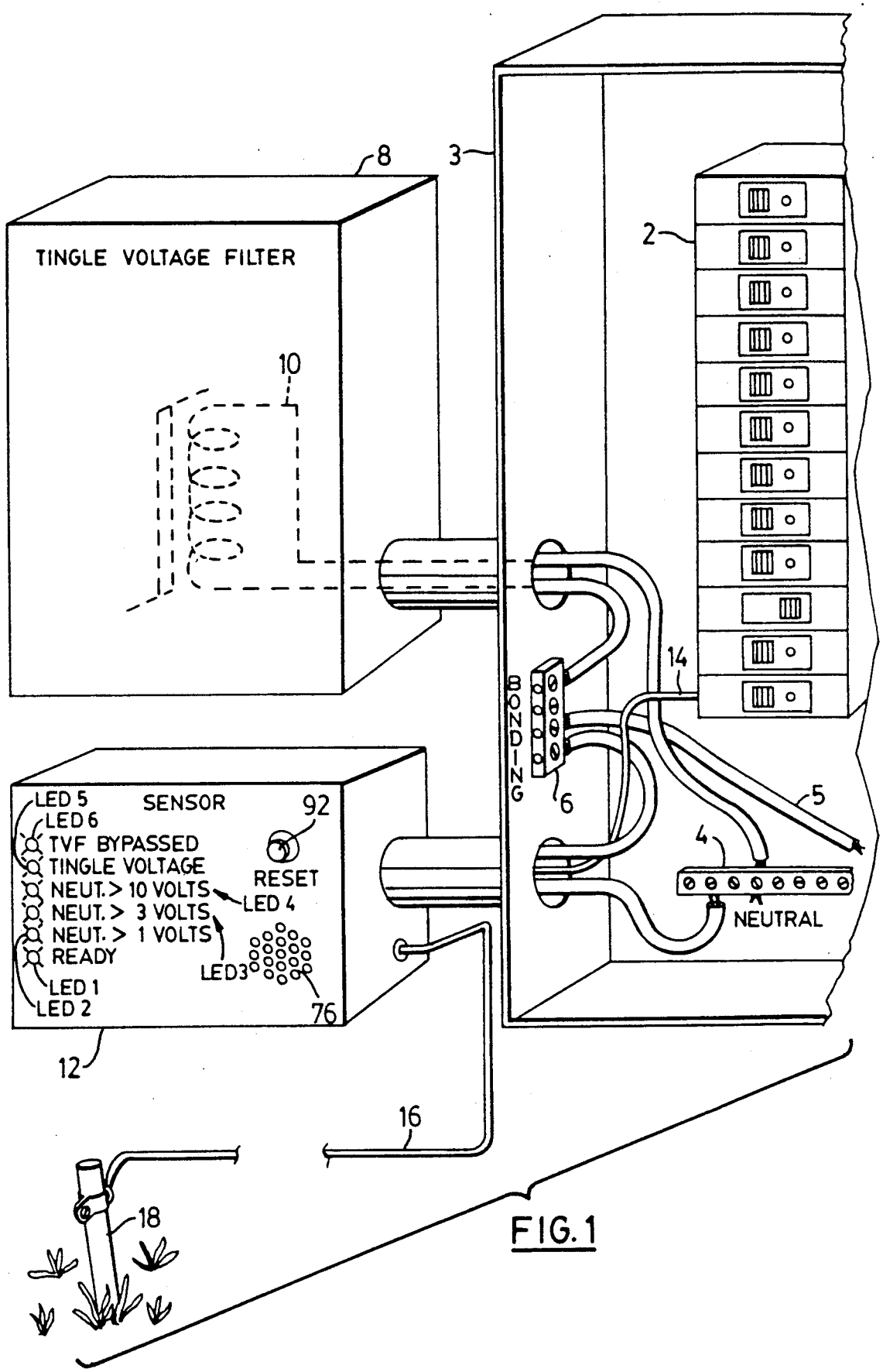

Referring to the drawings, FIG. 1 shows a distribution panel 2 forming part of the electrical installation of a structure such as a livestock barn. The casing 3 of the distribution panel is grounded in accordance with normal practice and applicable electrical codes, for example by a grounding conductor 5 bonded to the case at 6 and to a local ground (not shown). Neutral conductors of the installation are connected to a neutral bus bar 4, which instead of being bonded directly to the panel casing at 6 or to another appropriate ground, is connected through a tingle voltage filter 8, which consists of a saturating inductor 10 housed in a suitable casing. The saturating inductor has a normal inductance such as to present an impedance at line frequency which is high (typically greater than 200 ohms), compared to that expected for ground paths within the structure to be protected, (typically less than 10 ohms), so that the portion of current seeking a return path via the grounding of the distribution panel is greatly reduced. This is because the impedance of that return path will be greatly increased. Since the impedance is mainly concentrated in the filter, most of the potential developed across this return path will be developed across the filter. The maximum potential developed across ground paths in or adjacent the structure is much reduced, reducing the risk of persons and particularly livestock being exposed to differential voltages sufficient to produce "tingle voltage" effects. Such filtering, described in the Williston patent, is believed effective to reduce tingle voltage effects to acceptable levels under all normal operating conditions.

Review suggests that a certain type of wiring error, dangerous in itself, could give rise to a situation in which tingle voltages could actually be increased by the presence of the tingle voltage filter, although probably not to hazardous levels. This error is the reversal of neutral and ground connections to an appliance, the appliance being used in circumstances in which its metallic parts, nominally grounded by a ground conductor, are not otherwise bonded to ground. In these circumstances, the return current from the appliance will pass via the bonding 6 and thence partly via ground, and partly via the inductor 10 of tingle voltage filter 8 and the neutral connection 4 of the installation. Because of the impedance of the filter, bonding ground potential and thus the tingle voltage can be increased. At the same time, the metallic parts of the appliance will be at neutral rather than local ground potential, giving rise to further potential tingle voltages.

With a view to overcoming these problems, a device 12 is connected between the bonding 6 and the neutral bus bar 4 in parallel with the inductor 10. Power for the device is provided by a line connection 14. The primary function of the device is to sense when the potential at the bonding 6, relative to the ground potential, becomes large enough, either in absolute value or in comparison with the potential of the neutral bus bar 4, as to give rise to the possibility of the existence of the situation of the wiring error or low level fault discussed above. In order to provide a true ground potential reference, against which the bonding and neutral potentials can be assessed, a connection 16 is provided from the device to a remote reference ground 18 located well away from an area or building to be protected by the inductor 10. Typically, the reference ground 18 will be located about 30 meters from the building.

Figure 2A:
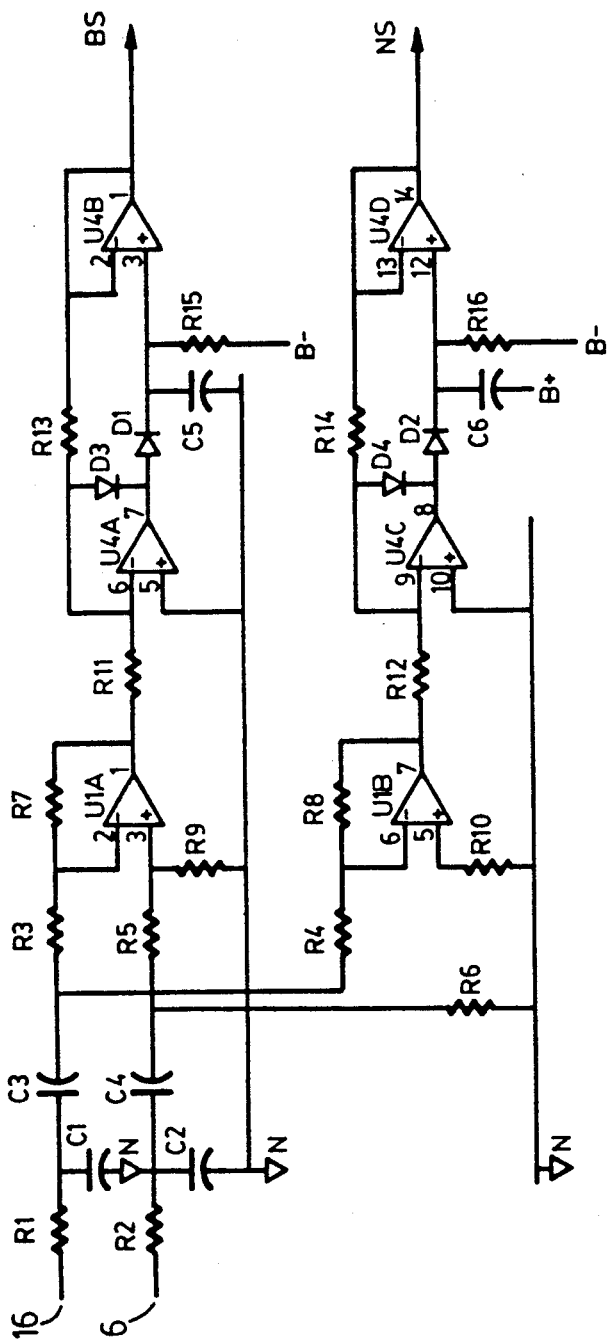
Figure 2A:
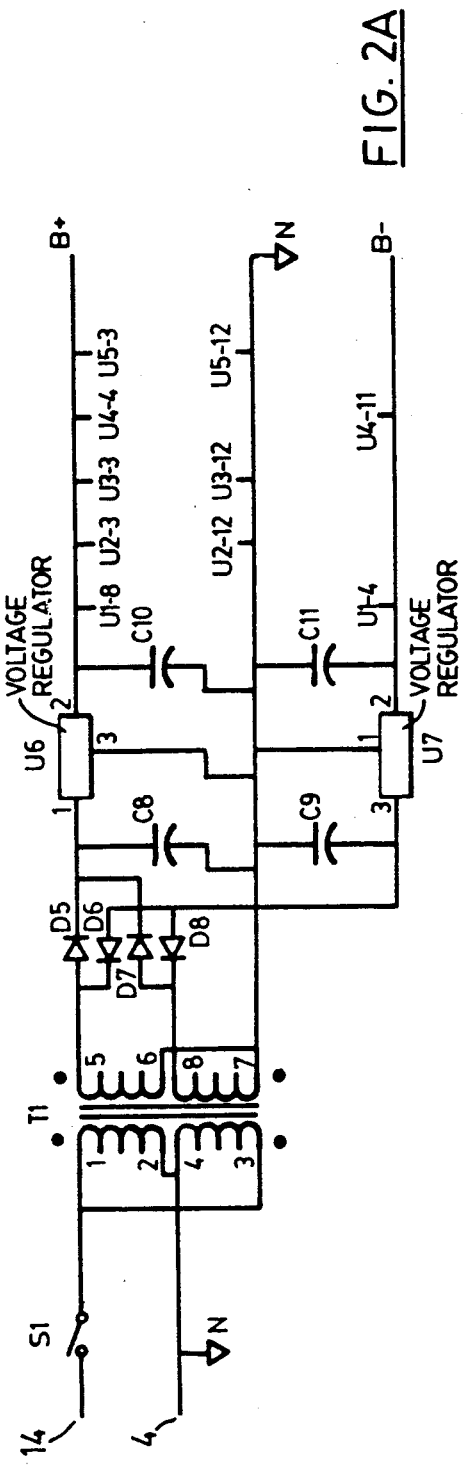
Figure 2B:
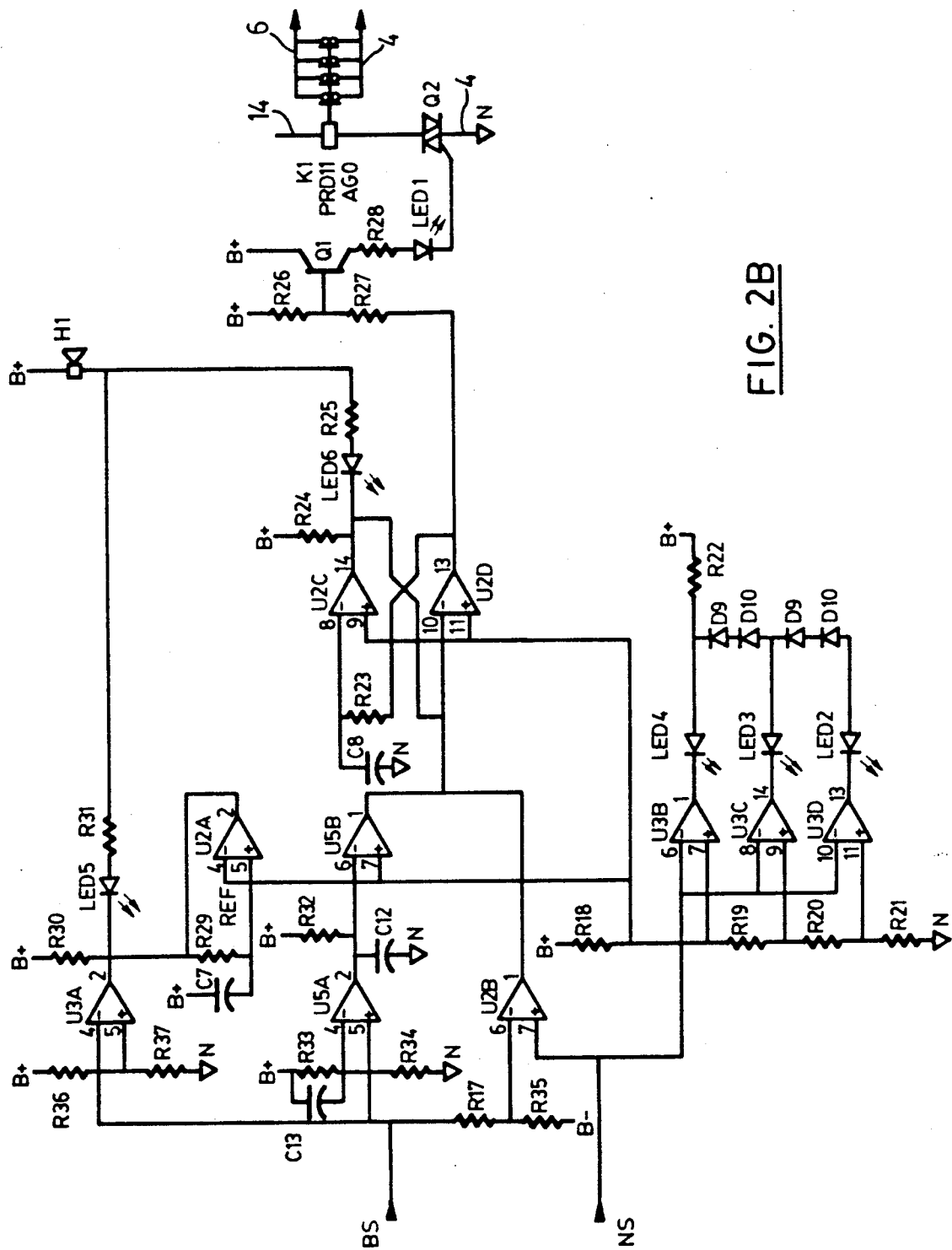

The device 12 is shown in more detail in FIGS. 2A and 2B. Referring first to FIG. 2A, a power supply of conventional construction is included, consisting of transformer T1, diode bridge D5, D6, D7 and D8, filter capacitors C8 and C9, voltage regulators U6 and U7, and stabilizing capacitors C10 and C11. The input to the power supply is connected to the line 14 via control switch S1, and to the neutral bus bar 4. The power supply provides positive and negative low voltage direct current supplies B+ and B-, and a zero voltage common connection N also connected to the neutral bus bar 4. The supplies B+ and B- supply operational amplifiers U1A, U1B, U4A-D, and voltage comparators U2A-D, U3A-D and U5A-D, as well as providing, together with the zero voltage common N, reference potentials at various points in the circuit as signified by the symbols B+, B- and N. The potentials appearing between remote ground 16 and the bonding ground 6 on the one hand and the neutral bus bar 4 on the other hand are applied to the inputs of operational amplifier U1A through networks including direct current blocking capacitors C3 and C4, filters comprising capacitors C1 and C2 and resistors R1 and R2 which remove unwanted high frequency transients, and high value input resistors R3 and R5 which co-operate with resistors R7 and R9 to set the gain and common mode rejection characteristics of this first stage amplifier. The output of the first stage amplifier connects to the input of operational amplifier U4A through resistor R11 which cooperates with resistor R13 to set the gain of this second stage amplifier. Diodes D3 and D1 connected in the output and feedback paths of the second stage amplifier, together with holding capacitor C5 and bleed resistor R15 convert the second stage amplifier into a peak detector of the AC potential appearing at its input. The output of the second stage amplifier connects to the input of operational amplifier V4B, which is configured as a unity gain voltage follower, to eliminate the loading effect on holding capacitor C5 of subsequent devices. The output of this third stage amplifier, labelled BS is a DC potential which represents the peak value of the potential at the bonding 6 relative to the remote ground 16.

A filtered input corresponding to the potential difference between the remote ground 16 and the neutral 4 is also applied to a first stage amplifier similar to that of the previous paragraph, but consisting of input resistors R4 and R6, gain setting resistors R8 and R10, and operational amplifier U1B. As in the preceding paragraph, the first stage amplifier feeds a second stage peak detecting amplifier, consisting of operational amplifier U4C, input resistor R12, gain setting resistor R14, rectifying diodes D4 and D2, holding capacitor C6, and bleed resistor R16. Operational amplifier U4D is the third stage voltage follower. The output of the third stage, labelled NS is a DC potential which represents the peak value of the potential at the neutral 4 relative to the remote ground 16.

Referring now to FIG. 2B, the potential on the line BS is compared to a first reference potential, formed from B+ and N by resistors R33 and R34 by voltage comparator U5A. When the potential on line BS exceeds this reference, the output of voltage comparator U5A turns off, allowing time delay capacitor C12 to begin charging through resistor R32. The potential on time delay capacitor c12 is compared to a second reference potential, formed from B+ and N by resistors R18, R19, R20 and R21, by voltage comparator U5B. Should the signal on line BS continuously exceed the former reference potential long enough for the voltage on time delay capacitor c12 to exceed the latter reference potential, the output of voltage comparator U5B is driven to N, which sets a flip-flop formed by voltage comparators U2C and U2D. This flip-flop is reset at power up of the device by capacitor C8. Setting of the flip-flop turns on the electronic buzzer H1 and activates a light emitting diode LED 6 which indicates the device has latched; it also turns off a transistor Q1 by removal of its base drive current, which in turn turns off a further light emitting diode LED 1 which normally indicates that the device is in a ready condition, and also turns off a triac Q2. The power terminals of the triac Q2 are in series with a solenoid switch K1 which is normally held open under power, and reacts to the turn off of triac Q2 by closing and thus short circuiting the bonding 6 to the neutral bus bar 4, so as to bypass the inductor 10 of tingle voltage filter 8.

The potential on the line BS, reduced by the potential drop across resistor R17 resulting from the current drawn by resistor R35, is also compared to the potential on the line NS by voltage comparator U2B. When the potential on the line BS exceeds the potential on the line NS by a margin greater than the potential drop across resistor R17, the output of voltage comparator U2B is immediately driven to N, which sets the flip-flop described in the previous paragraph, and causes the identical audible and visual indications and bypassing of the inductor 10 of the tingle voltage filter.

In order to provide further indication of the status of the system, a further voltage comparator U3A compares the potential on the line BS to a third reference potential formed from B+ and N by resistors R36 and R37. When the signal on line BS exceeds this reference, the output of voltage comparator U3A is driven to N, turning on the electronic buzzer H1 and activating light emitting diode LED 5, which indicates the presence of tingle voltage, since the signal on line BS represents the peak amount of the potential at the bonding 6 relative to the remote ground. Normally the values of resistors R36 and R37 would be selected so as to result in an indication of tingle voltage at a level higher than would be encountered when the system was without fault and where the only source of tingle voltage is that resulting from the inevitable leakage through the inductor 10 while not saturated, but a level less than that likely to be encountered in the case of the wiring error or low level fault discussed above. When tingle voltage is present and as a result the output of voltage comparator U3A is driven to N, time delay capacitor c27 is charged through resistor R29, causing the potential at the juncture of C7 and R29 to decrease with time. If the tingle voltage persists sufficiently long, the output of voltage comparator U2A will be driven to N, resulting in the tingle voltage indication being held until the device is reset. Normally, the values of capacitor C27 and resistor R29 would be selected so as to result in the indication being held only when tingle voltage is present for sufficiently long a duration that there is little probability that the condition is a transitory one which can be safely ignored.

Means are also provided to indicate the potential at the neutral bus bar 4 relative to the reference ground 16. This neutral potential would be a tingle voltage potential were it not for the blocking effect of the tingle voltage filter, and thus indication of a substantial value of neutral potential while at the same time no tingle voltage is indicated shows that the filter is operating correctly and is performing a beneficial function. For this purpose, the potential on the line NS is applied to a series of comparators U3B, U3C and U3D whose other terminals are fed by reference potentials from a potential divider ladder formed by resistors R18, R19, R20 and R21, the output of the comparators being in series with light emitting diodes LED 2, LED 3, and LED 4 respectively, in series with appropriate current limiting elements. The resistors in the ladder may be selected so that the diodes illuminate to indicate potentials of the neutral exceeding 1, 3 and 10 volts respectively, as shown in FIG. 1, although other values could of course be chosen. Whilst the 1 and 3 volt levels may occur in normal service, illumination of the 10 volte diode indicates a neutral fault.

Once the inductor of tingle voltage filter 8 has been bypassed by the switch K1, the device 12 must be powered down and repowered to reset the flip-flop formed by comparators U2C and U2D. This is conveniently achieved by a reset switch S1 (see FIG. 2A). This reset function provides a convenient method for tracing a circuit which contains the fault giving rise to a problem causing bypassing of the filter. Assuming that the fault persists, the device can be repeatedly reset whilst isolating each circuit in the system in turn by turning off its circuit breaker or removing its fuse. When the device no longer acts to bypass the filter, the then isolated circuit is the one at fault.

It should be understood that whilst the foregoing embodiment represents the presently preferred means of implementing the invention, various modifications and developments are possible. The circuitry utilized employs generally available integrated circuits, but similar functions can readily be achieved utilizing alternative components and circuitry. Similarly, different means for indicating the status of the system could be utilized in place of the light emitting diodes and buzzer exemplified, and different means for peak detection could be utilized possibly down stream from the voltage comparators rather than upstream as described here.

We claim:

1. In apparatus for reducing differential potentials between different portions of a grounded structure due to current flow through a ground path in that structure, said apparatus comprising a saturating inductor in series with said ground path and with a local ground of an electrical supply utilized in association with the structure, the improvement wherein;
   the apparatus further includes means to establish a circuit bypassing said saturating inductor;
   means to establish a reference ground remote from said local ground;
   monitoring means responsive to conditions under which the retention of said saturating inductor in said ground path would be potentially hazardous, including means to sense the potential difference between the local ground with which the inductor is in series and the remote reference ground; and
   means, responsive to the sustained presence of an excessive potential difference between the local ground and the remote ground to actuate said bypass circuit establishing means.

2. Apparatus according to claim 1, wherein said sensing means includes means to produce a first signal proportional to the potential appearing between the remote ground and the local ground, and further including means to produce a second signal proportional to a potential appearing between the remote ground and a neutral conductor of the supply and means to establish a control signal in response to said first signal sustaining a level greater than one of a predetermined threshold and a sustained level of said second signal, said means actuating the bypass signal being actuated on receipt of said control signal.

3. Apparatus according to claim 1, wherein the sensing means senses the peak potential difference between the local ground and the remote reference ground.

4. Apparatus according to claim 2, wherein the means producing said first and second signals are responsive to the peak potentials operating between said remote ground and said local ground and neutral conductor respectively.

5. Apparatus according to claim 2, further including indicator means responsive to at least one level of at least one of said first and second signals.

6. Apparatus according to claim 2, further including indicator means indicative of the status of said means actuating the bypass means.

7. Apparatus according to claim 4, further including indicator means responsive to at least one level of at least one of said first and second signals.

8. Apparatus according to claim 4, further including indicator means indicative of the status of said means actuating the bypass means.

* * * * *